US012331549B2

(12) United States Patent
Chuang et al.

(10) Patent No.: US 12,331,549 B2
(45) Date of Patent: Jun. 17, 2025

(54) ELECTRONIC LOCK

(71) Applicant: TONG LUNG METAL INDUSTRY CO., LTD., Chiayi County (TW)

(72) Inventors: Pai-Hsiang Chuang, New Taipei (TW); Yu Lin, Chiayi (TW); Chun-Yi Fang, Yunlin County (TW); Ding-Sian Cai, Chiayi County (TW); Chen-Ming Lin, Chiayi County (TW); Ruei-Jie Jeng, Chiayi County (TW)

(73) Assignee: TONG LUNG METAL INDUSTRY CO., LTD., Chiayi County (TW)

( * ) Notice: Subject to any disclaimer, the term of this patent is extended or adjusted under 35 U.S.C. 154(b) by 371 days.

(21) Appl. No.: 17/857,343

(22) Filed: Jul. 5, 2022

(65) Prior Publication Data

US 2023/0228126 A1 Jul. 20, 2023

(30) Foreign Application Priority Data

Jan. 20, 2022 (TW) .................................. 111102352

(51) Int. Cl.
*E05B 47/00* (2006.01)

(52) U.S. Cl.
CPC .. *E05B 47/0012* (2013.01); *E05B 2047/0017* (2013.01); *E05B 2047/002* (2013.01); *E05B 2047/0036* (2013.01); *E05B 2047/0067* (2013.01)

(58) Field of Classification Search
CPC ......... E05B 47/0012; E05B 2047/0017; E05B 2047/002; E05B 2047/0036; E05B 2047/0067
USPC ............................................................ 70/264
See application file for complete search history.

(56) References Cited

U.S. PATENT DOCUMENTS

| | | | | |
|---|---|---|---|---|
| 6,012,310 | A * | 1/2000 | Hsiao | E05B 47/026 70/279.1 |
| 8,365,561 | B2 * | 2/2013 | Chang | E05B 47/02 70/279.1 |
| 9,797,162 | B2 * | 10/2017 | Maguire | E05B 47/0009 |
| 2011/0036131 | A1 * | 2/2011 | Chiou | E05B 47/0012 70/91 |
| 2013/0192317 | A1 * | 8/2013 | McKibben | G08C 17/02 292/144 |
| 2019/0003207 | A1 * | 1/2019 | Wu | E05B 47/026 |
| 2021/0062547 | A1 * | 3/2021 | Chen | E05B 9/02 |

(Continued)

FOREIGN PATENT DOCUMENTS

| | | |
|---|---|---|
| TW | M389150 U | 9/2010 |

*Primary Examiner* — Kristina R Fulton
*Assistant Examiner* — James Edward Ignaczewski
(74) *Attorney, Agent, or Firm* — Burris Law, PLLC

(57) ABSTRACT

An electronic lock includes a deadbolt, a driver mechanism, a transmission mechanism and a control mechanism. The transmission mechanism includes a transmission gear that is driven by the driver mechanism to rotate, a resilient unit that is mounted to and co-rotatable with the transmission gear, and a rotary member that is operable to rotate relative to the transmission gear between a locking position and an unlocking position, and that is connected to the deadbolt. The control mechanism is connected to the rotary member, and ceases operation of the driver mechanism when detecting that the rotary member has been rotated to one of the locking and unlocking positions.

10 Claims, 14 Drawing Sheets

(56) References Cited

U.S. PATENT DOCUMENTS

| | | | | |
|---|---|---|---|---|
| 2023/0051877 | A1 * | 2/2023 | Liang | E05B 47/0012 |
| 2023/0228124 | A1 * | 7/2023 | Nayak | E05B 63/04<br>70/280 |

* cited by examiner

ELECTRONIC LOCK

CROSS-REFERENCE TO RELATED APPLICATION

This application claims priority to Taiwanese Invention Patent Application No. 111102352, filed on Jan. 20, 2022.

FIELD

The disclosure relates to a lock, and more particularly to an electronic lock.

BACKGROUND

Electronic locks are widely adopted as a security measure for new houses or offices so that users can effortlessly unlock doors via passwords, their fingerprints, or keycards. To enhance the function of the electronic locks and make them more user friendly, the design of the electronic locks, such as the design of a conventional one disclosed in Taiwanese Utility Model Patent No. M389150, has become increasingly complicated.

Referring to FIGS. 13 to 15, the conventional electronic lock includes an operating unit 12, a first driven wheel 15, a second driven wheel 16 and a torsion spring 19. The first driven wheel 15 is sleeved onto and rotatable relative to the operating unit 12, and has a surface that is recessed to form a plurality of arc-shaped grooves 151. The torsion spring 19 is disposed in one of the arc-shaped grooves 151 and has two end portions 191. The second driven wheel 16 is fixedly sleeved onto the operating unit 12, and includes a block 161 that protrudes from a surface of the second driven wheel 16 facing the first driven wheel 15 into one of the arc-shaped grooves 151, and that is movable relative to the one of the arc-shaped grooves 151. When the first driven wheel 15 is driven to rotate, one of the end portions 191 of the torsion spring 19 is urged by the first driven wheel 15 to push the block 161 so that the second driven wheel 16 drives the operating unit 12 to rotate. Consequently, via the rotation of the operating unit 12, the conventional electronic lock locks or unlocks a door.

In addition, the conventional electronic lock further includes a plurality of sensor switches 17 that detect varying positions of the first and second driven wheels 15, 16 so that the conventional electronic lock can be operated both manually and automatically. However, the abovementioned configuration of the conventional electronic lock may result in an increase in the manufacturing cost because of its complexity.

SUMMARY

Therefore, an object of the disclosure is to provide an electronic lock that has a configuration which is relatively simple and different from the abovementioned prior art.

According to an aspect of the disclosure, the electronic lock includes a deadbolt, a driver mechanism, a transmission mechanism and a control mechanism. The deadbolt is operable to convert between a locking state and an unlocking state. The transmission mechanism includes a transmission gear, a resilient unit and a rotary member. The transmission gear has a shaft hole that extends along a rotating axis of the transmission gear, and is driven by the driver mechanism to rotate when the driver mechanism is actuated. The resilient unit is mounted to and co-rotatable with the transmission gear, and defines a movement space that corresponds in position to the shaft hole. The rotary member is connected to the deadbolt, is operable to rotate relative to the transmission gear between a locking position and an unlocking position, and has a shaft portion and at least one protruding portion. The shaft portion extends through the shaft hole, is rotatable relative to the transmission gear about the rotating axis, and has an outer surrounding surface. The at least one protruding portion protrudes from the outer surrounding surface, and rotates about the rotating axis in the movement space when the rotary member rotates. The resilient unit is capable of pushing the at least one protruding portion to urge the rotary member to rotate between the locking position and the unlocking position when the transmission gear rotates. The deadbolt is correspondingly converted between the locking state and the unlocking state when the rotary member rotates between the locking position and the unlocking position. The control mechanism is connected to the rotary member, and ceases operation of the driver mechanism when detecting that the rotary member has been rotated to one of the locking position and the unlocking position.

According to another aspect of the disclosure, the electronic lock includes a deadbolt, a driver mechanism, a transmission mechanism and a control mechanism. The deadbolt is operable to convert between a locking state and an unlocking state. The transmission mechanism includes a transmission gear, a resilient unit and a rotary member. The transmission gear has a shaft hole that extends along a rotating axis of the transmission gear, and is driven by the driver mechanism to rotate when the driver mechanism is actuated. The resilient unit is mounted to and co-rotatable with the transmission gear, defines a movement space that corresponds in position to the shaft hole, and includes at least one resilient member that extends across the shaft hole in a direction orthogonal to the rotating axis and that is mounted to the transmission gear. The rotary member is connected to the deadbolt, is operable to rotate relative to the transmission gear between a locking position and an unlocking position, and has a shaft portion and at least one protruding portion. The shaft portion extends through the shaft hole, is rotatable relative to the transmission gear about the rotating axis, and has an outer surrounding surface. The at least one protruding portion protrudes from the outer surrounding surface, and rotates about the rotating axis in the movement space when the rotary member rotates. The resilient unit is capable of pushing the at least one protruding portion to urge the rotary member to rotate between the locking position and the unlocking position when the transmission gear rotates. The deadbolt is correspondingly converted between the locking state and the unlocking state when the rotary member rotates between the locking position and the unlocking position. The control mechanism is connected to the rotary member, and ceases operation of the driver mechanism when detecting that the rotary member has been rotated to one of the locking position and the unlocking positions. The at least one resilient member is located at one side of the shaft portion of the rotary member. When the rotary member is rotated to one of the locking position and the unlocking position, the at least one protruding portion of the rotary member abuts against the at least one resilient member so that movement of the rotary member is restrained by the at least one resilient member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
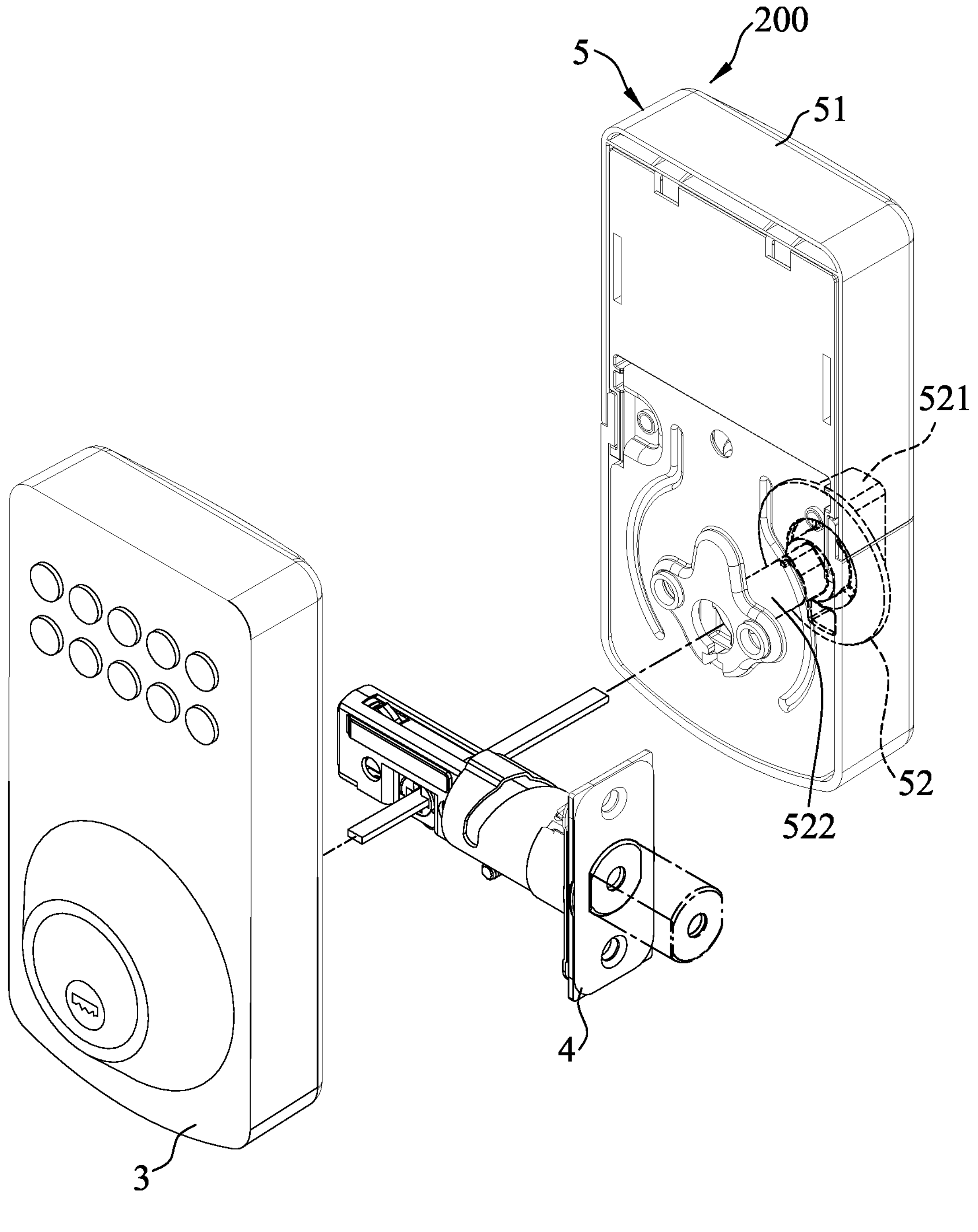
FIG. 1 is a partly exploded perspective view of an embodiment of an electronic lock according to the disclosure.
Figure 2:
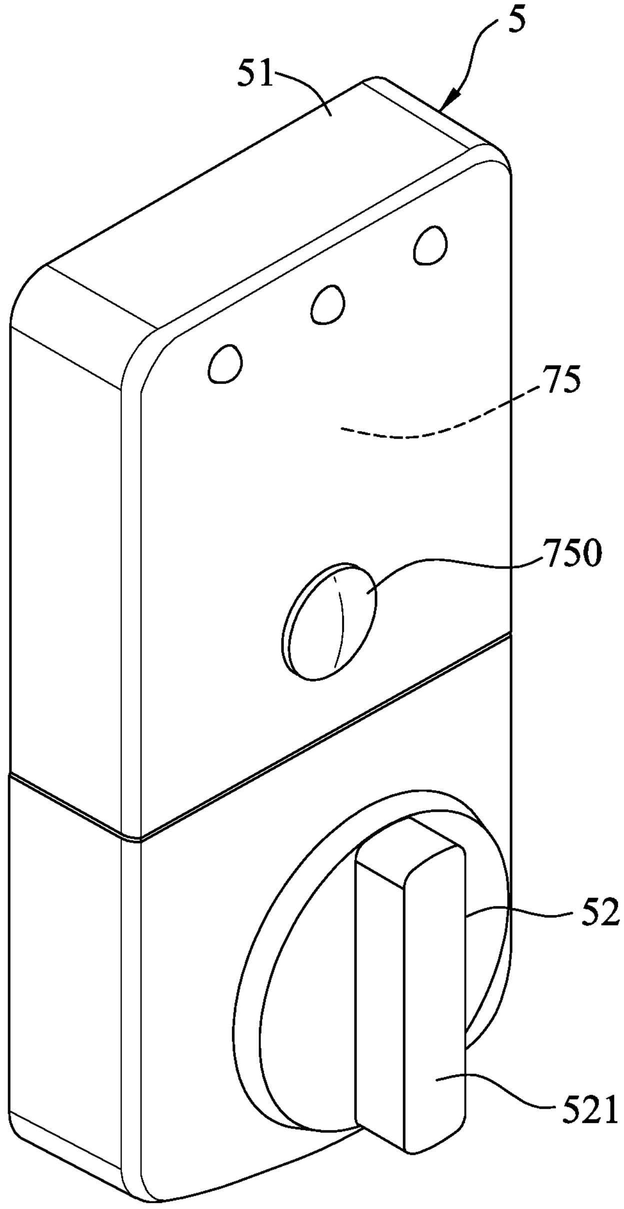
FIG. 2 is a perspective view of a transmission mechanism of the embodiment.
Figure 3:
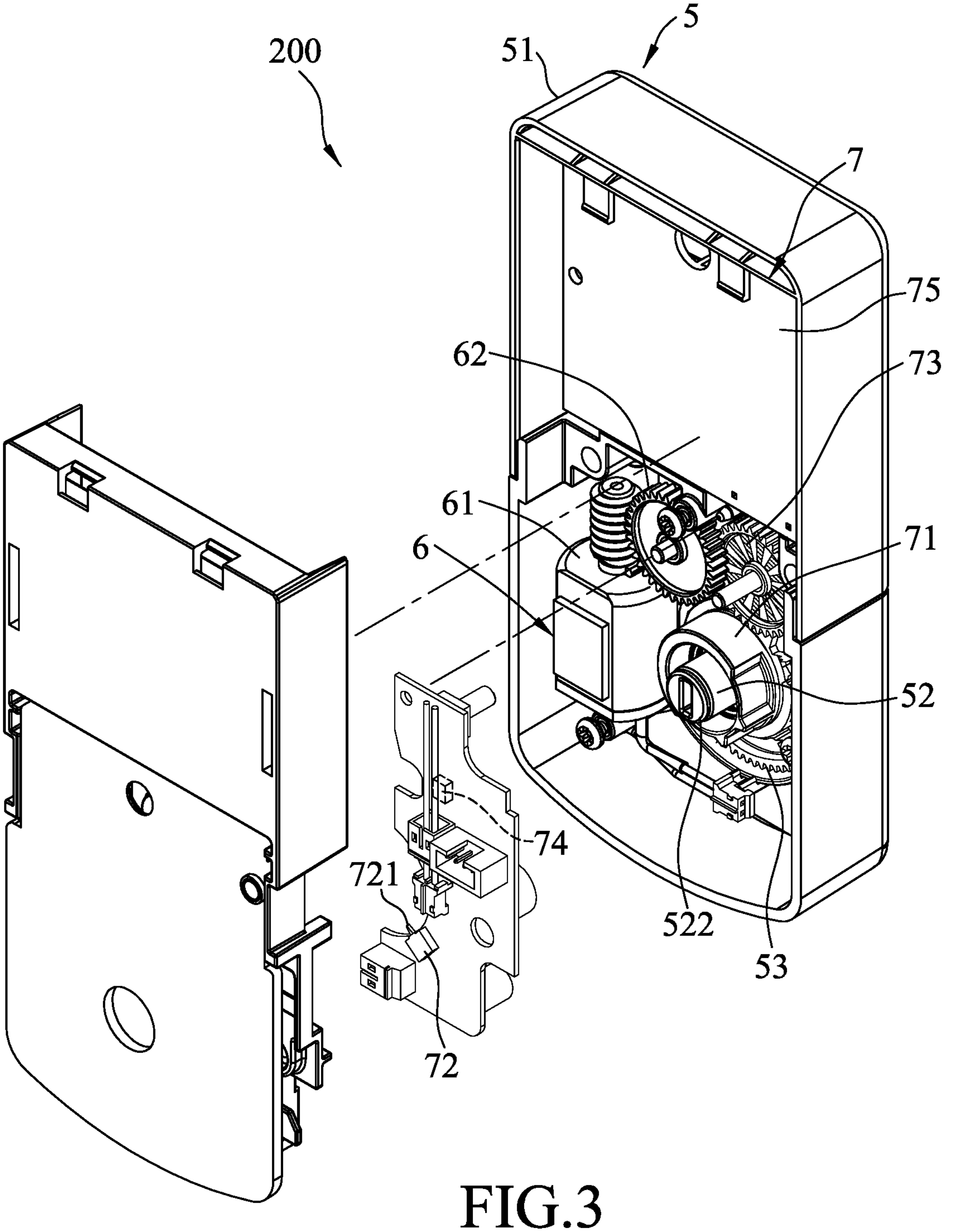
FIG. 3 is a partly exploded perspective view of the transmission mechanism.

Referring to FIGS. 1 to 3, an embodiment of an electronic lock 200 according to the disclosure is adapted to be mounted to a left-handed door (not shown), and is capable of being operated both automatically and manually to lock or unlock the door. The electronic lock 200 includes an outer lock body 3, a deadbolt 4, a transmission mechanism 5, a driver mechanism 6 and a control mechanism 7. The outer lock body 3 and the transmission mechanism 5 are adapted to be respectively mounted to an exterior side and an interior side (i.e., the side that faces a room) of the door. The deadbolt 4 interconnects the outer lock body 3 and the transmission mechanism 5, and is mounted to one of stiles of the door between the exterior side and the interior side of the door. The driver mechanism 6 and the control mechanism 7 are disposed in the transmission mechanism 5.

The outer lock body 3 is designed to be both key-operated and password-protected, and is signally coupled to the control mechanism 7. However, in certain embodiments, the outer lock body 3 may only be password-protected and may not be connected to the deadbolt 4. The deadbolt 4 is operable to be driven by the transmission mechanism 5 to convert between a locking state (see the dot-dash broken lines in FIG. 1), in which the deadbolt 4 protrudes from the door, and an unlocking state, in which the deadbolt 4 is retracted into the door. Since the relevant features of this disclosure do not concern the specific configurations of the outer lock body 3 and the deadbolt 4, which are widely understood by those skilled in the art and may have various configurations different from those disclosed in the Figures, further details of the same are omitted herein for the sake of brevity.

Figure 5:
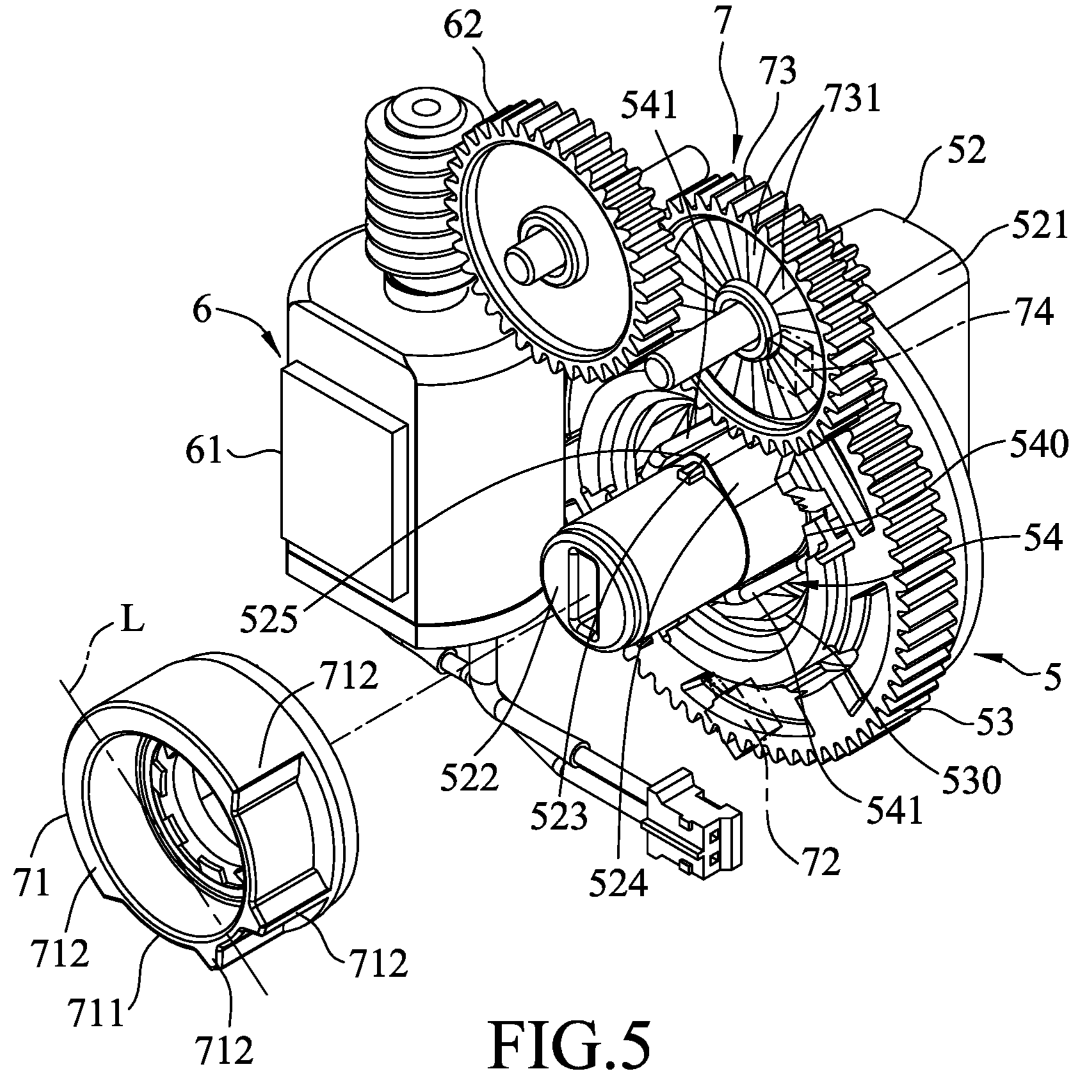
FIG. 5 is a partly exploded perspective view of a portion of the embodiment.

The transmission mechanism 5 includes a casing 51, a rotary member 52, a transmission gear 53 and a resilient unit 54 (see FIG. 5). The rotary member 52 extends into and is rotatable relative to the casing 51. The transmission gear 53 is disposed in and rotatable relative to the casing 51. The rotary member 52 and the transmission gear 53 rotate coaxially. The resilient unit 54 is mounted to and co-rotatable with the transmission gear 53.

Figure 9:
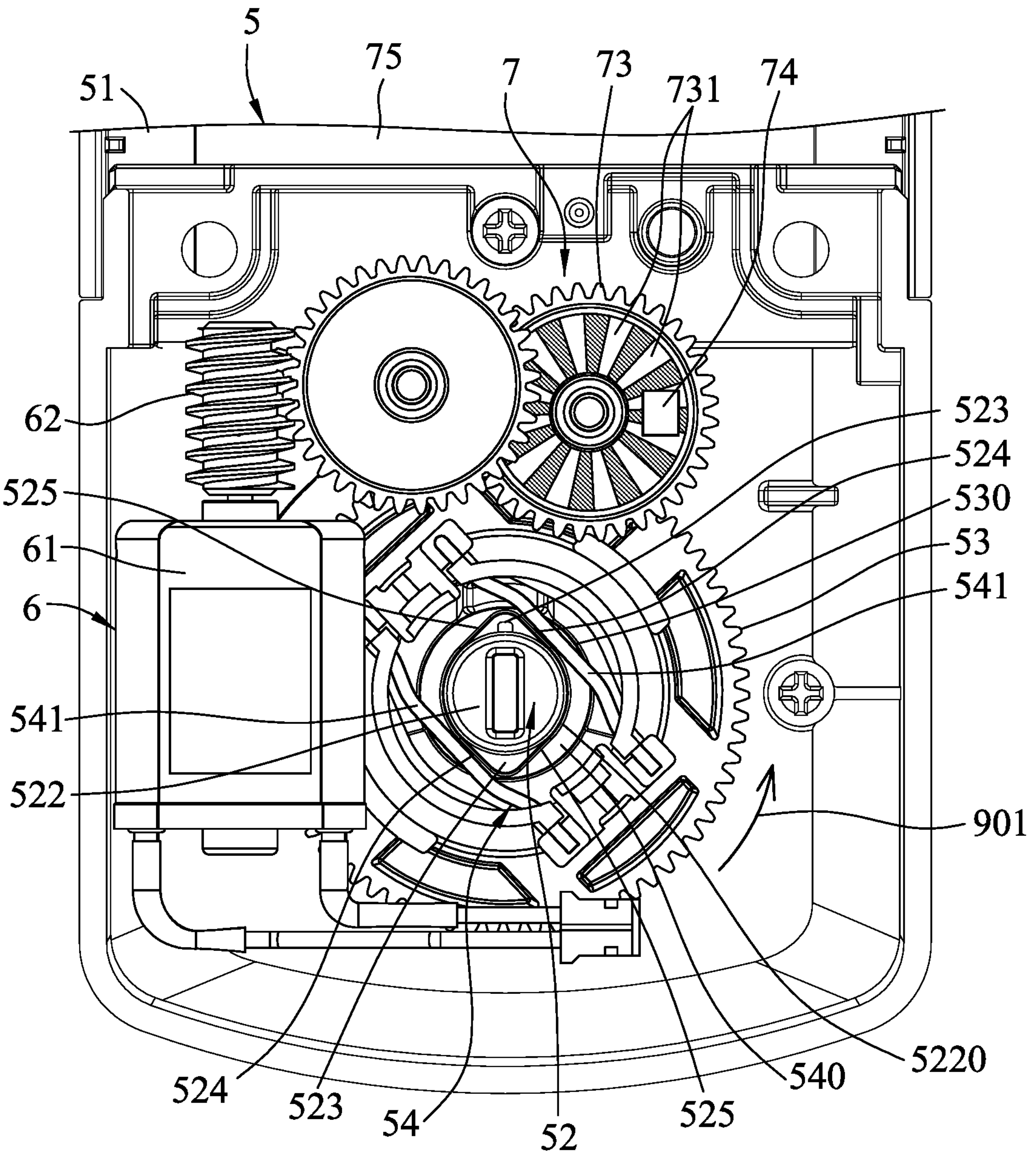
FIG. 9 is a view similar to FIG. 6, but illustrating a transmission gear at an initial position and a rotary member at a locking position.
Figure 10:
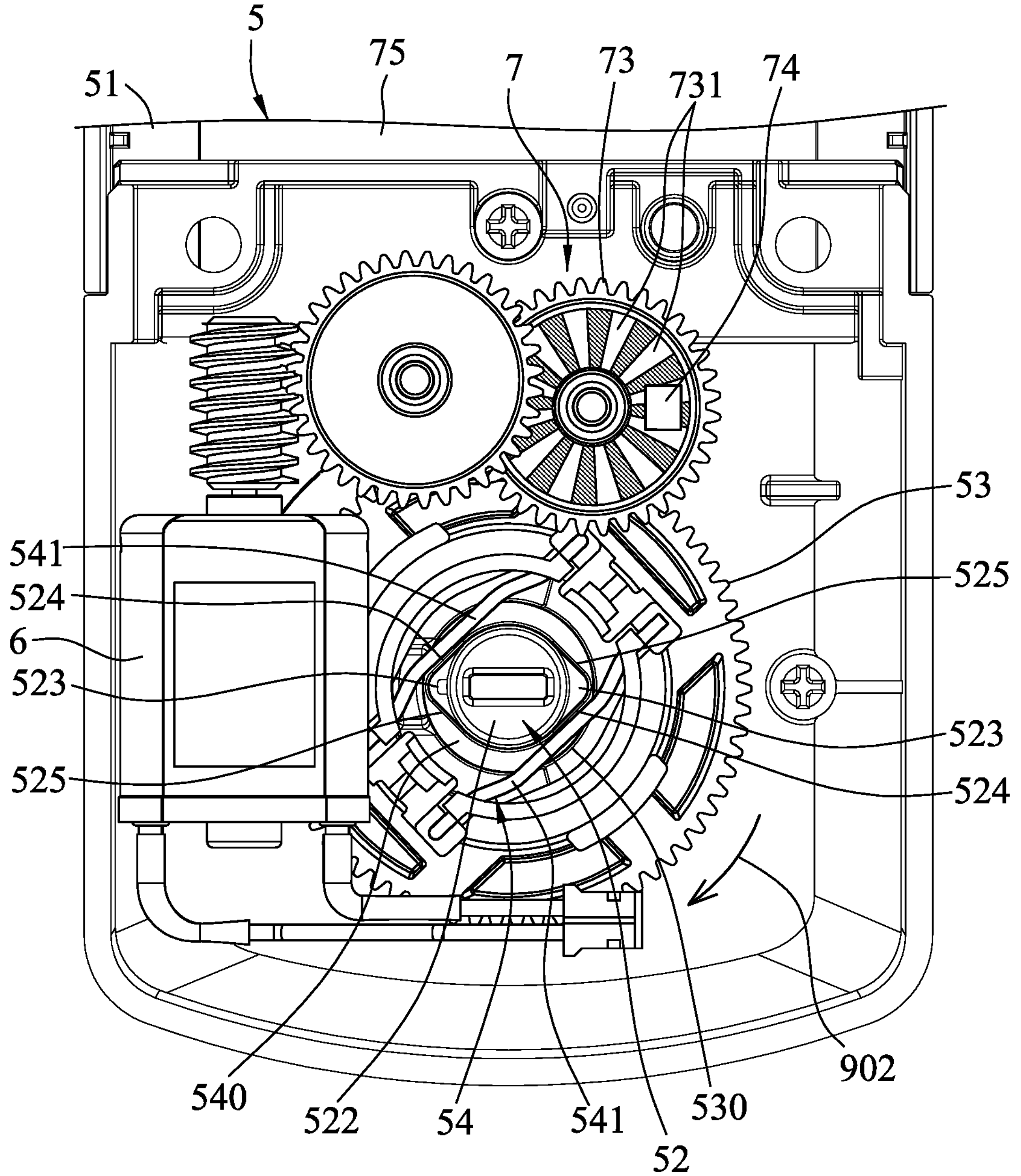
FIG. 10 is a view similar to FIG. 9, but illustrating the transmission gear at a first position and the rotary member at an unlocking position.

The rotary member 52 has an operation portion 521, a shaft portion 522 and two protruding portions 523 (see FIG. 9). The operation portion 521 is exposed from the casing 51 and is used for manual operation. The shaft portion 522 extends from the operation portion 521 into the casing 51, is connected to the deadbolt 4, and has an outer surrounding surface 5220. The protruding portions 523 respectively protrude from diametrically-opposite sides of the outer surrounding surface 5220 of the shaft portion 522. Each of the protruding portions 523 has a first abutting surface 524 and a second abutting surface 525 that are spaced apart from each other at the outer surrounding surface 5220, that extend from the outer surrounding surface 5220 toward each other, and that are symmetrical with respect to an imaginary plane on which a rotating axis of the rotary member 52 lies. The rotary member 52 is operable to rotate relative to the casing 51 and the transmission gear 53 between a locking position (see FIG. 9) and an unlocking position (see FIG. 10). The deadbolt 4 is correspondingly converted between the locking state and the unlocking state when the rotary member 52 rotates between the locking position and the unlocking position.

The transmission gear 53 has a shaft hole 530 that extends along a rotating axis of the transmission gear 53. For brevity purposes, each of the rotating axis of the rotary member 52 and the rotating axis of the transmission gear 53 will hereinafter be referred to as the rotating axis since the rotary member 52 and the transmission gear 53 rotate coaxially. The shaft portion 522 of the rotary member 52 extends through the shaft hole 530 and is rotatable relative to the transmission gear 53 about the rotating axis. The resilient unit 54 includes two resilient members 541. Each of the resilient members 541 extends across the shaft hole 530 in a direction orthogonal to the rotating axis, is elongated, and is mounted to the transmission gear 53. The resilient members 541 are located at two opposite sides of the shaft portion 522 of the rotary member 52 in a diametrical direction of the shaft portion 522, and cooperatively define a movement space 540 that corresponds in position to the shaft hole 530. The protruding portions 523 of the rotary member 52 are located in the movement space 540. When the rotary member 52 rotates relative to the transmission gear 53 between the locking position and the unlocking position, the protruding portions 523 will rotate about the rotating axis in the movement space 540.

Figure 11:
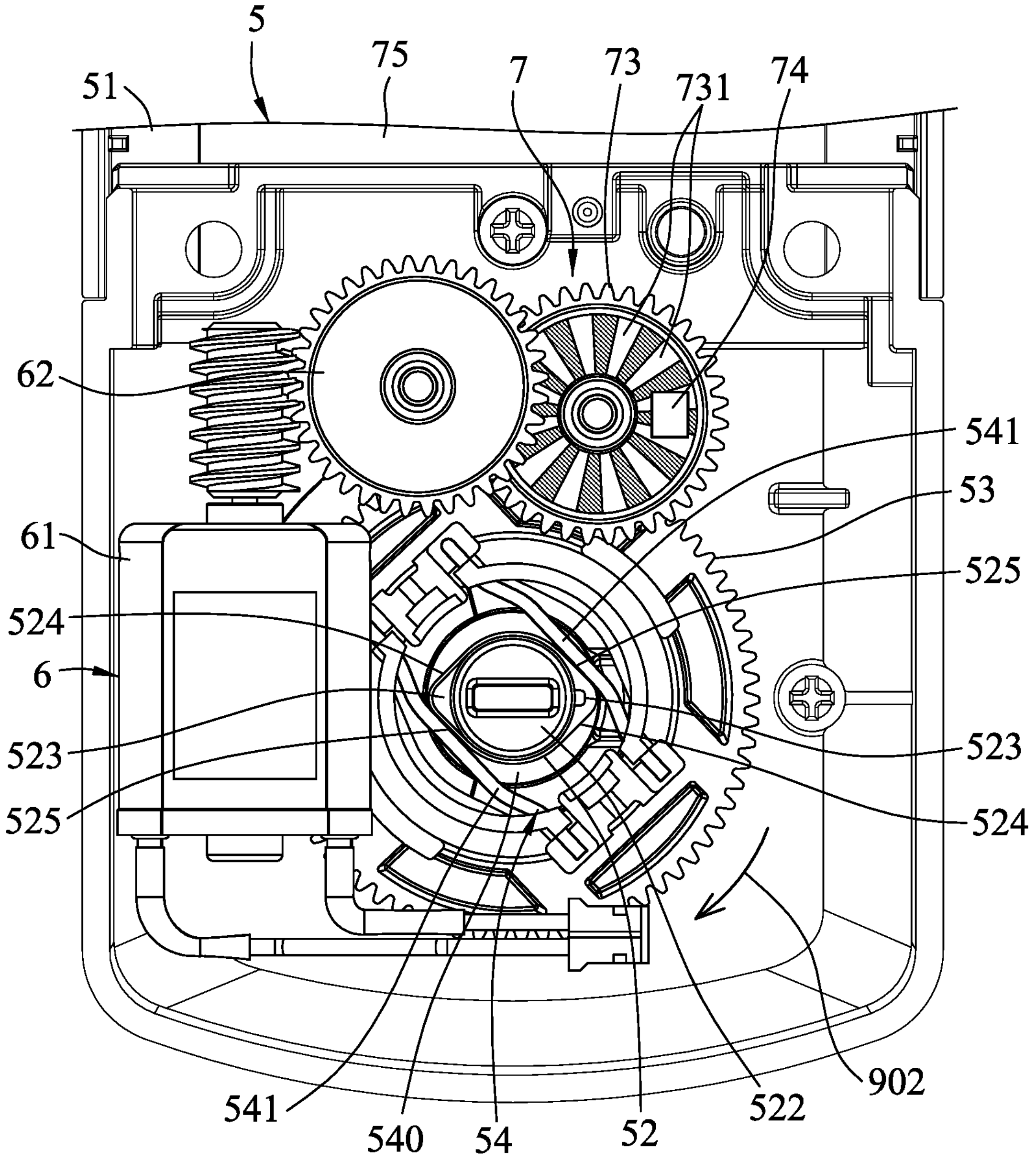
FIG. 11 is a view similar to FIG. 10, but illustrating the transmission gear at the initial position and the rotary member at the unlocking position.
Figure 12:
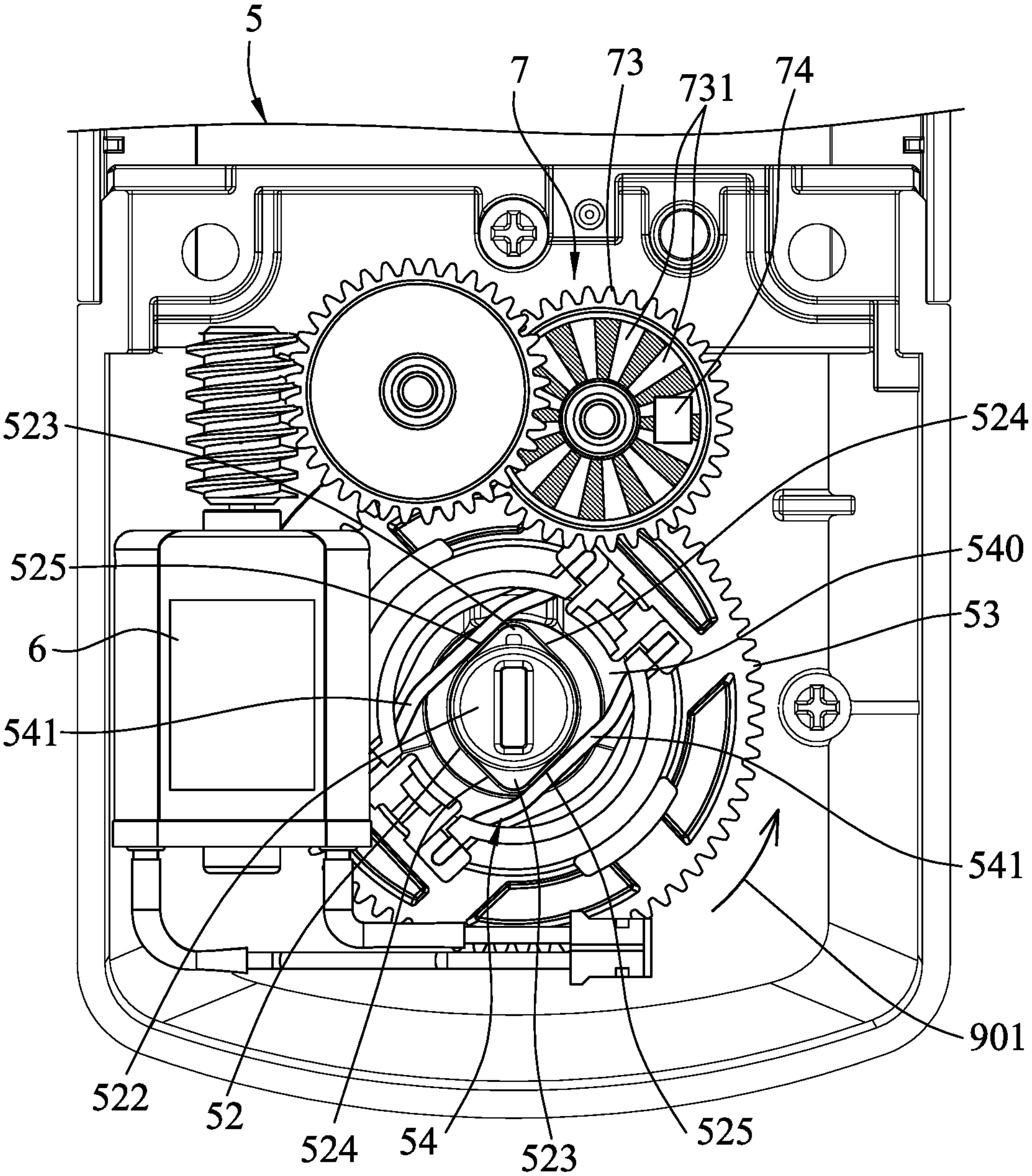
FIG. 12 is a view similar to FIG. 11, but illustrating the transmission gear at a second position and the rotary member at the locking position.
Figure 13:
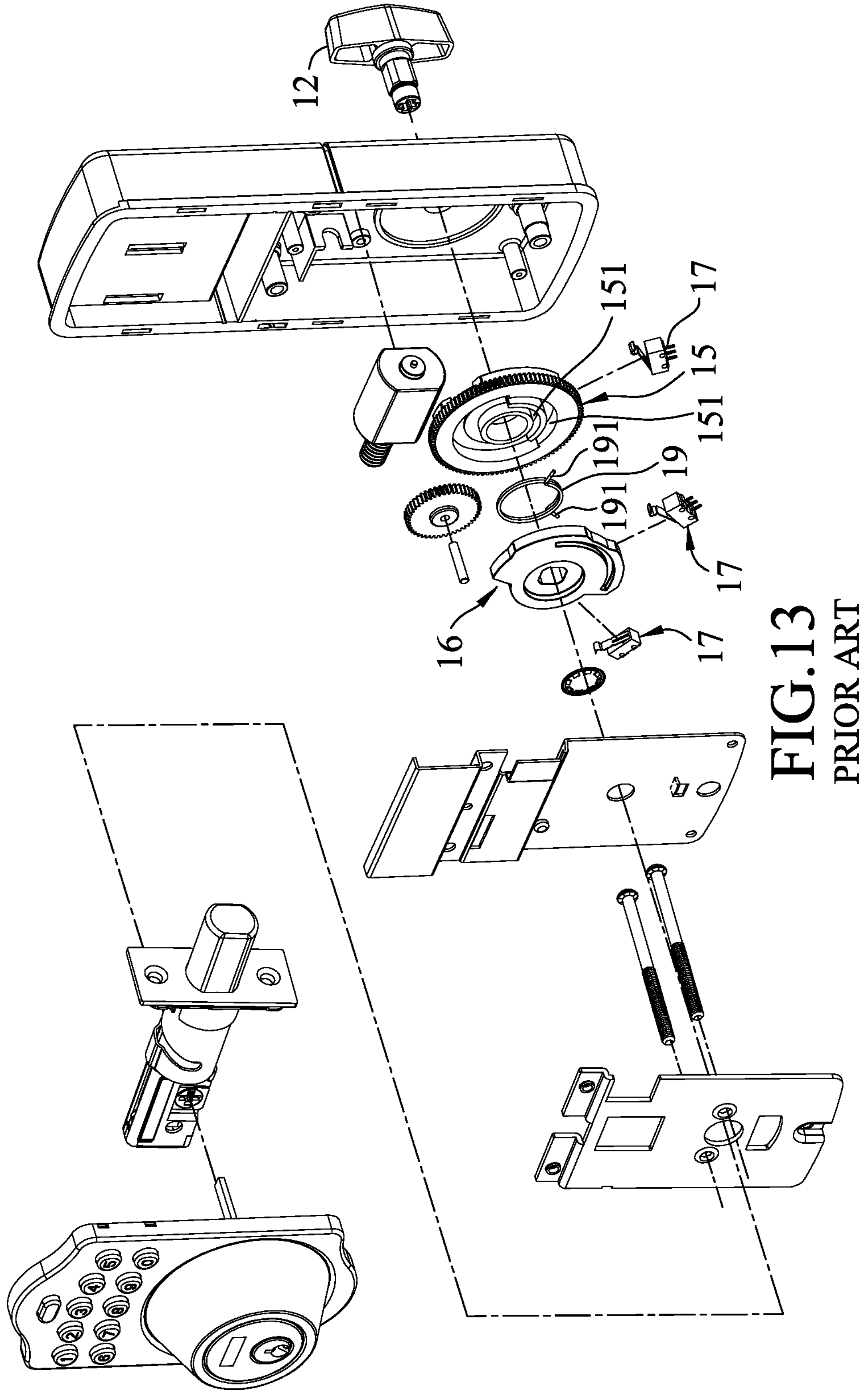
FIG.13 PRIOR ART
FIG. 13 is an exploded perspective view of a conventional electronic lock disclosed in Taiwanese Utility Model Patent No. M389150.
Figure 15:
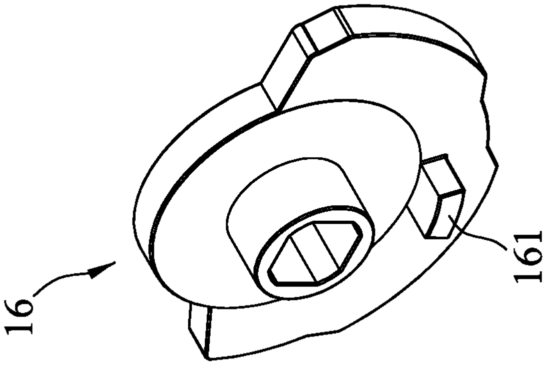
FIG.15 PRIOR ART
FIG. 15 is a perspective view of a second driven wheel of the conventional electronic lock.
Figure 14:
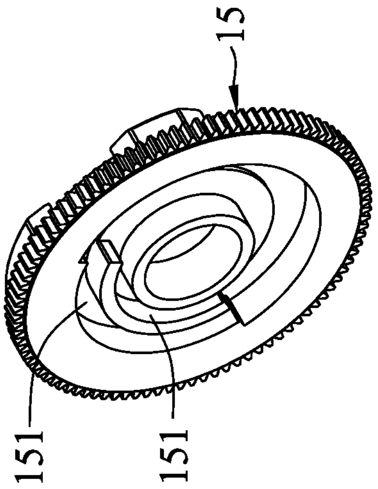
FIG.14 PRIOR ART
FIG. 14 is a perspective view of a first driven wheel of the conventional electronic lock.

The transmission gear 53 is driven by the driver mechanism 6 to rotate when the driver mechanism 6 is actuated, and urges the resilient members 541 to co-rotate. Specifically, the driver mechanism 6 is capable of driving the transmission gear 53 to rotate from an initial position (see FIG. 9) to a first position (see FIG. 10) in a first rotating direction 901, and subsequently rotate from the first position back to the initial position (see FIG. 11) in a second rotating direction 902 opposite to the first rotating direction 901. When the transmission gear 53 is at the initial position as shown in FIG. 11, the driver mechanism 6 is capable of driving the transmission gear 53 to rotate from the initial position to a second position (see FIG. 12) in the second rotating direction 902, and subsequently rotate from the second position back to the initial position (see FIG. 9) in the first rotating direction 901.

The resilient unit 54 is capable of pushing the protruding portions 523 of the rotary member 52 to urge the rotary member 52 to rotate between the locking position and the unlocking position when the transmission gear 53 rotates. When the rotary member 52 is at the locking position and when the transmission gear 53 is rotated from the initial position (see FIG. 9) to the first position, the resilient members 541 will respectively push the first abutting surfaces 524 of the protruding portions 523 to urge the rotary member 52 to rotate from the locking position to the unlocking position. When the transmission gear 53 is at the first position, the first abutting surfaces 524 of the protruding portions 523 are respectively abutted against the resilient members 541 so that movement of the rotary member 52 is restrained by the resilient members 541. Afterwards, when the transmission gear 53 is rotated from the first position back to the initial position, the rotary member 52 will stay at the unlocking position (see FIG. 11). When the rotary member 52 is at the unlocking position and when the transmission gear 53 is rotated from the initial position (see FIG. 11) to the second position, the resilient members 541 will respectively push the second abutting surfaces 525 of the protruding portions 523 to urge the rotary member 52 to rotate from the unlocking position to the locking position. When the transmission gear 53 is at the second position, the second abutting surfaces 525 of the protruding portions 523 are respectively abutted against the resilient members 541 so that the movement of the rotary member 52 is restrained by the resilient members 541. Afterwards, when the transmission gear 53 is rotated from the second position back to the initial position, the rotary member 52 will stay at the locking position (see FIG. 9). When the transmission gear 53 is at the initial position, the rotary member 52 is operable to rotate relative to the transmission gear 53 between the unlocking position and the locking position without driving rotation of the transmission gear 53.

It should be noted that, when the resilient members 541 urge the rotary member 52 to rotate between the locking and unlocking positions, or when the resilient members 541 restrain the movement of the rotary member 52, it may be possible that the resilient members 541 do not always abut against the protruding portions 523 of the rotary member 52.

The driver mechanism 6 is disposed in the casing 51, and includes a motor 61, and a gear train 62 that is connected to the motor 61 and that is connected to the transmission gear 53 via the control mechanism 7. When the motor 61 is actuated, the motor 61 will drive the transmission gear 53 to rotate among the initial position, the first position and the second position via the gear train 62. Since the driver mechanism 6 is widely understood by those skilled in the art, in certain embodiments, the configuration thereof may be different from the one that is disclosed in the Figures.

Figure 4:
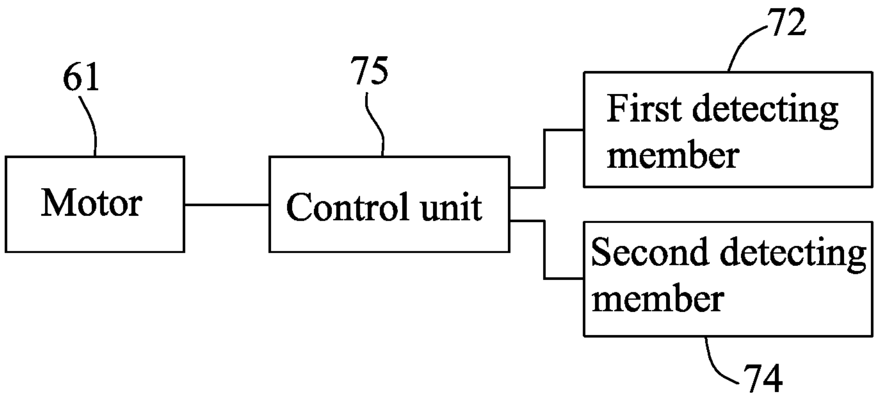
FIG. 4 is a block diagram illustrating connections among a motor, a control unit, a first detecting member and a second detecting member of the embodiment.

Referring to FIG. 4, in cooperation with FIGS. 3 and 5, the control mechanism 7 is disposed in the casing 51, is connected to the rotary member 52, and includes a lock orientation member 71, a first detecting member 72, a rotation member 73, a second detecting member 74 and a control unit 75. The lock orientation member 71 is fixedly sleeved onto the shaft portion 522 of the rotary member 52, is co-rotatable with the rotary member 52, and is rotatable relative to the first detecting member 72. The first detecting member 72 is disposed circumferentially outside the lock orientation member 71. The rotation member 73 meshes with the gear train 62 and the transmission gear 53, and is driven by the driver mechanism 6 to rotate. The second detecting member 74 corresponds in position to the rotation member 73 in a direction of a rotating axis of the rotation member 73. The control unit 75 is signally coupled to the first detecting member 72, the second detecting member 74 and the motor 61.

Figure 6:
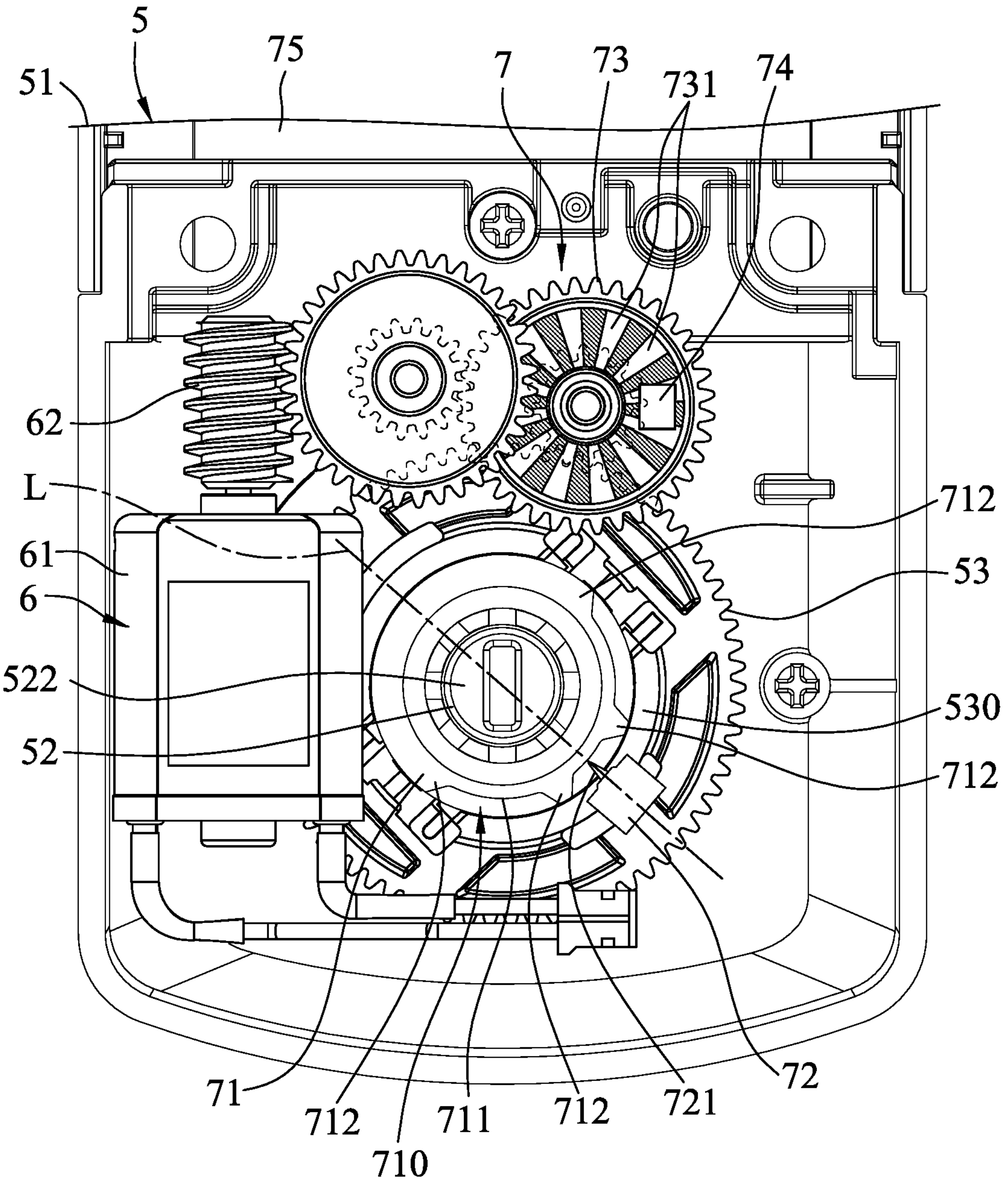
FIG. 6 is a fragmentary rear view illustrating the first detecting member in a first detecting state.
Figure 7:
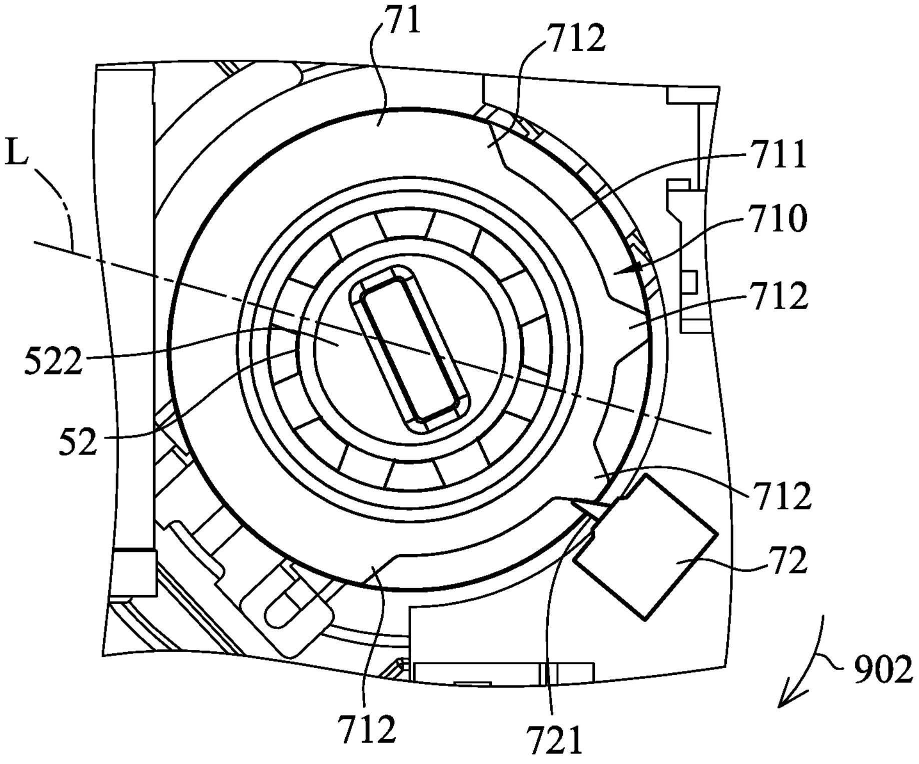
FIG. 7 is an enlarged view of FIG. 6, but illustrating the first detecting member in a second detecting state.
Figure 8:
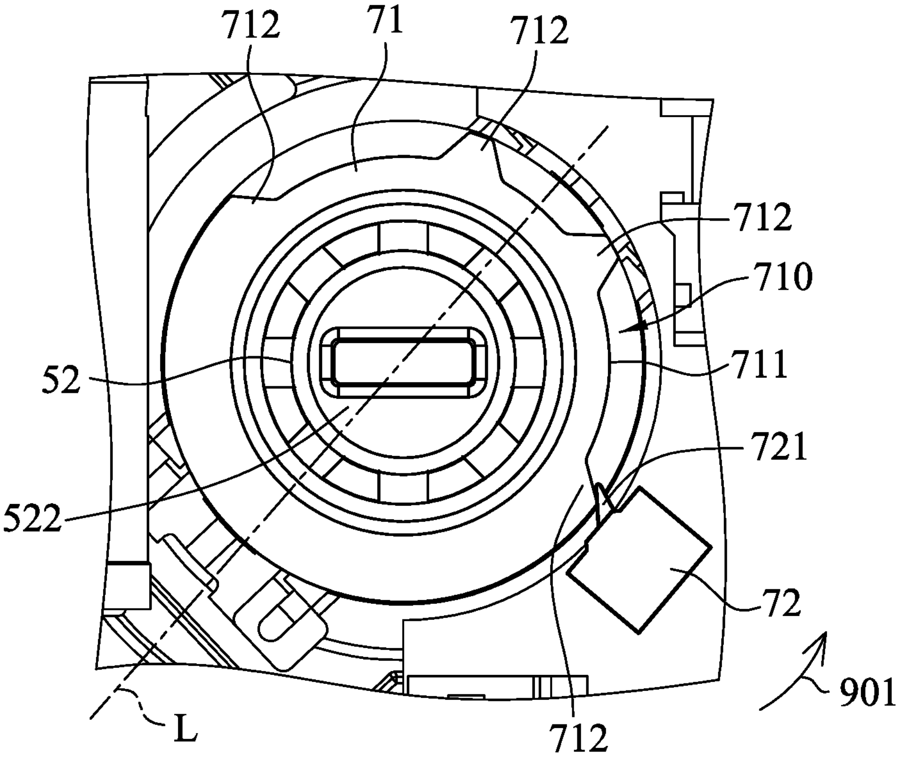
FIG. 8 is a view similar to FIG. 7, but illustrating the first detecting member in a third detecting state.

Further referring to FIGS. 6 to 8, the lock orientation member 71 has an imaginary axis (L) that is perpendicular to the rotating axis of the rotary member 52, and an outer surrounding surface 710 that has a detecting zone 711. The detecting zone 711 extends about the rotating axis of the rotary member 52, is configured to be in a shape of a 180-degree arc, and is symmetrical with respect to an imaginary plane on which the imaginary axis (L) and the rotating axis of the rotary member 52 lie.

The lock orientation member 71 further has a plurality of state-converting portions 712 that are disposed about the rotating axis and spaced apart from each other. Specifically, the state-converting portions 712 protrude at intervals at the detecting zone 711, are symmetrical with respect to the imaginary plane on which the imaginary axis (L) and the rotating axis of the rotary member 52 lie, and are divided into two distal state-converting portions 712, and two middle state-converting portions 712 that are located between the distal state-converting portions 712 in a circumferential direction of the lock orientation member 71. The first detecting member 72 includes a lever 721. When the deadbolt 4 is in the locking state (i.e., the rotary member 52 is at the locking position), the lever 721 is pointed in a direction of the imaginary axis (L) of the lock orientation member 71, is kept at a distance from the state-converting portions 712 of the lock orientation member 71, and is located between the middle state-converting portions 712. When the lock orientation member 71 rotates relative to the first detecting member 72, and when one of the state-converting portions 712 moves past the lever 721, the lever 721 will be pushed by the one of the state-converting portions 712.

The first detecting member 72 is convertible among three detecting states upon the relative rotation of the lock orientation member 71. Specifically, when the lever 721 is kept at a distance from the state-converting portions 712 as shown in FIG. 6, the first detecting member 72 is in a first detecting state. When the lock orientation member 71 rotates relative to the first detecting member 72 and pushes the lever 721 in the second rotating direction 902 via one of the middle state-converting portions 712 thereof (see FIG. 7), the first detecting member 72 is in a second detecting state. When the lock orientation member 71 rotates relative to the first detecting member 72 and pushes the lever 721 in the first rotating direction 901 via one of the distal state-converting portions 712 thereof (see FIG. 8), the first detecting member 72 is in a third detecting state. The first detecting member 72 generates first detecting signals that respectively correspond to the first, second and third detecting states. For example, the first detecting signals may have an amplitude that includes three different levels, such as "0," "1" and "2", which respectively represent the first detecting state, the second detecting state and the third detecting state.

The rotation member 73 is configured to be a gear that has two opposite surfaces in the direction of the rotating axis of the rotation member 73, and has a plurality of rotation indicating portions 731 that are arranged about the rotating axis of the rotation member 73 and that are spaced apart from each other. When the motor 61 is actuated, the rotation member 73 is driven by the gear train 62 to rotate. The second detecting member 74 is signally coupled to the control unit 75, and generates a second detecting signal when detecting rotation of the rotation indicating portions 731 about the rotating axis of the rotation member 73.

In this embodiment, the rotation indicating portions 731 are located at one of the opposite surfaces of the rotation member 73. The second detecting member 74 faces the one of the opposite surfaces of the rotation member 73, and emits light toward the rotation member 73. Each of the rotation indicating portions 731 is capable of reflecting the light. When the second detecting member 74 detects that the light is alternately reflected and not reflected, the second detecting member 74 will correspondingly generate the second detecting signal.

However, in one embodiment (not shown), each of the rotation indicating portions 731 is configured to be a hole that extends through the rotation member 73 and that allows the light to travel therethrough, and the second detecting member 74 has a light-emitting portion and a light-detecting portion that respectively face the opposite surfaces of the rotation member 73. When the light-detecting portion detects that the light emitted toward the rotation member 73 by the light-emitting portion travels through the rotation indicating portions 731, the light-detecting portion will correspondingly generate the second detecting signal. That is to say, the second detecting member 74 is capable of generating the second detecting signal when detecting that the light is reflected by the rotation member 73, or when detecting that the light travels through the rotation member 73.

Moreover, in still another embodiment, each of the rotation indicating portions 731 is magnetic, and the second detecting member 74 is configured to be an electronic device (e.g., a Hall effect sensor) that is capable of detecting changes in a magnetic field so that when the rotation indicating portions 731 rotate about the rotating axis of the rotation member 73 relative to the second detecting member 74, the second detecting member 74 will detect changes in a magnetic field of the rotation member 73 and correspondingly generate the second detecting signal.

Referring to FIGS. 2 to 4 again, the control unit 75 includes a control member 750 that is exposed from the casing 51 and that is operable, is configured to store a locking procedure and an unlocking procedure that are executed one at a time, and is capable of keeping the position information of the rotary member 52. If the rotary member 52 is at the unlocking position and the position information thereof is kept as the latest position information by the control unit 75, when a user operates the control member 750, the control unit 75 will execute the locking procedure. If the rotary member 52 is at the locking position and the position information thereof is kept as the latest position information by the control unit 75, when a user operates the control member 750, the control unit 75 will execute the unlocking procedure. Furthermore, since the outer lock body 3 is signally coupled to the control mechanism 7 and may be designed to be password-protected, the control unit 75 will execute the locking and unlocking procedures upon operation of the outer lock body 3 (i.e., entering the password).

If the door is locked (i.e., as shown in FIGS. 6 and 9, the rotary member 52 is at the locking position, the transmission gear 53 is at the initial position, the lever 721 is pointed in the direction of the imaginary axis (L) of the lock orientation member 71 and is located between the middle state-converting portions 712, and the first detecting member 72 is in the first detecting state and generates the first detecting signal that corresponds to the first detecting state), the control unit 75 will execute the unlocking procedure upon the operation of one of the outer lock body 3 and the control member 750. When the control unit 75 executes the unlocking procedure, the control unit 75 will control the driver mechanism 6 to drive the transmission gear 53 to rotate from the initial position to the first position in the first rotating direction 901 so that the resilient members 541 can respectively push the first abutting surfaces 524 of the rotary member 52 to urge the rotary member 52 to rotate from the locking position to the unlocking position. As the rotary member 52 rotates, the lock orientation member 71 will rotate relative to the first detecting member 72 in the first rotating direction 901, and the rotation member 73 will be driven by the driver mechanism 6 to rotate relative to the second detecting member 74. When the lock orientation member 71 rotates, the lever 721 is sequentially pushed by one of the middle state-converting portions 712 and one of the distal state-converting portions 712 in the first rotating direction 901, which will cause the first detecting member 72 to be sequentially converted from the first detecting state into the third detecting state, from the third detecting state into the first detecting state, and from the first detecting state into the third detecting state. Each time the first detecting member 72 is in the first detecting state, the first detecting member 72 generates the first detecting signal that corresponds to the first detecting state. Each time the first detecting member 72 is in the third detecting state, the first detecting member 72 generates the first detecting signal that corresponds to the third detecting state. The control unit 75 is further configured to store a locked signal set and an unlocked signal set, and will determine whether the first detecting signals generated by the first detecting member 72 conform with the unlocked signal set. When the control unit 75 determines that the first detecting signals generated by the first detecting member 72 conform with the unlocked signal set, the control unit 75 will cease operation of the driver mechanism 6 (i.e., the control unit 75 ceases the operation of the driver mechanism 6 when detecting that the rotary member 52 has been rotated to the unlocking position). At this time, the rotary member 52 is at the unlocking position (see FIG. 10), the lever 721 is pushed by the one of the distal state-converting portions 712 in the first rotating direction 901 as shown in FIG. 8, and the deadbolt 4 is in the unlocking state. Subsequently, the control unit 75 will control the driver mechanism 6 to drive the transmission gear 53 to rotate relative to the rotary member 52 from the first position to the initial position in the second rotating direction 902.

When the transmission gear 53 rotates relative to the rotary member 52 from the first position to the initial position in the second rotating direction 902, the resilient members 541 are urged to rotate away from the first abutting surfaces 524 of the rotary member 52 so that the rotary member 52 and the lock orientation member 71 are not urged to rotate (i.e., the rotary member 52 stays at the unlocking position). The rotation member 73 is driven by the driver mechanism 6 to rotate as the transmission gear 53 rotates, and the second detecting member 74 detects the rotation of the rotation member 73 and generates the second detecting signal.

The control unit 75 then determines whether an angle of the rotation of the transmission gear 53 reaches a preset angle by analyzing the second detecting signal generated by the second detecting member 74. When the control unit 75 determines that the angle of the rotation of the transmission gear 53 reaches the preset angle, the control unit 75 will cease the operation of the driver mechanism 6 and will keep the position information of the rotary member 52. At this time, because of the rotation of the transmission gear 53, the resilient members 541 are respectively abutted against the second abutting surfaces 525 of the rotary member 52 that is at the unlocking position (see FIG. 11). The door is therefore unlocked.

If the door is in an unlocked state (i.e., as shown in FIGS. 8 and 11, the rotary member 52 is at the unlocking position, the transmission gear 53 is at the initial position, the lever 721 is pushed by the one of the distal state-converting portions 712 of the lock orientation member 71, and the first detecting member 72 is in the third detecting state and generates the first detecting signal that corresponds to the third detecting state), the control unit 75 will execute the locking procedure upon the operation of one of the outer lock body 3 and the control member 750. When the control unit 75 executes the locking procedure, the control unit 75 will control the driver mechanism 6 to drive the transmission gear 53 to rotate from the initial position to the second position in the second rotating direction 902 so that the resilient members 541 can respectively push the second abutting surfaces 525 of the rotary member 52 to urge the rotary member 52 to rotate from the unlocking position to the locking position. As the rotary member 52 rotates, the lock orientation member 71 will rotate relative to the first detecting member 72 in the second rotating direction 902, and the rotation member 73 will be driven by the driver mechanism 6 to rotate relative to the second detecting member 74. When the lock orientation member 71 rotates, the lever 721 will be sequentially separated from the one of the distal state-converting portions 712, be pushed by the one of the middle state-converting portions 712 in the second rotating direction 902 (see FIG. 7), and be separated from the one of the middle state-converting portions 712, which will cause the first detecting member 72 to be sequentially converted from the third detecting state into the first detecting state, from the first detecting state into the second detecting state, and from the second detecting state into the first detecting state. Each time the first detecting member 72 is in the first detecting state, the first detecting member 72 generates the first detecting signal that corresponds to the first detecting state. Each time the first detecting member 72 is in the second detecting state, the first detecting member 72 generates the first detecting signal that corresponds to the second detecting state. Each time the first detecting member 72 is in the third detecting state, the first detecting member 72 generates the first detecting signal that corresponds to the third detecting state. The second detecting member 74 will then detect the rotation of the rotation member 73 and generate the second detecting signal. Next, the control unit 75 will determine whether an angle of the rotation of the transmission gear 53 reaches another preset angle by analyzing the second detecting signal generated by the second detecting member 74. When the control unit 75 determines that the angle of the rotation of the transmission gear 53 reaches the preset angle and that the first detecting signals generated by the first detecting member 72 conform with the locked signal set, the control unit 75 will cease operation of the driver mechanism 6 (i.e., the control unit 75 ceases the operation of the driver mechanism 6 when detecting that the rotary member 52 has been rotated to the locking position). At this time, the rotary member 52 is at the locking position (see FIG. 12), the lever 721 is pointed in the direction of the imaginary axis (L) of the lock orientation member 71 and is located between the middle state-converting portions 712 as shown in FIG. 6, and the deadbolt 4 is in the locking state. Subsequently, the control unit 75 will control the driver mechanism 6 to drive the transmission gear 53 to rotate relative to the rotary member 52 from the second position to the initial position in the first rotating direction 901.

When the transmission gear 53 rotates relative to the rotary member 52 from the second position to the initial position in the first rotating direction 901, the resilient members 541 are urged to rotate away from the second abutting surfaces 525 of the rotary member 52 so that the rotary member 52 and the lock orientation member 71 are not urged to rotate (i.e., the rotary member 52 stays at the locking position). The rotation member 73 is driven by the driver mechanism 6 to rotate as the transmission gear 53 rotates, and the second detecting member 74 detects the rotation of the rotation member 73 and generates the second detecting signal.

The control unit 75 then determines whether an angle of the rotation of the transmission gear 53 reaches still another preset angle by analyzing the second detecting signal generated by the second detecting member 74. When the control unit 75 determines that the angle of the rotation of the transmission gear 53 reaches the preset angle, the control unit 75 will cease the operation of the driver mechanism 6 and will keep the position information of the rotary member 52. At this time, because of the rotation of the transmission gear 53, the resilient members 541 are respectively abutted against the first abutting surfaces 524 of the rotary member 52 that is at the locking position (see FIG. 9). The door is therefore locked.

A user can turn the rotary member 52 to urge it to rotate between the locking position and the unlocking position when he/she wants to operate the electronic lock 200 manually to lock/unlock the door. Even when the rotary member 52 is operated manually, the control unit 75 can still determine whether the first detecting signals generated by the first detecting member 72 conform with the locked/unlocked signal set, and keep the position information of the rotary member 52 when the rotary member 52 is rotated to one of the locking and unlocking positions. That is to say, no matter how the rotary member 52 is urged to rotate, whether manually by a user or automatically by the rotation of the transmission gear 53, the control unit 75 will keep the position information of the rotary member 52 so the control unit 75 is still capable of executing the locking and unlocking procedures according to the position information of the rotary member 52, upon the operation of the control member 750.

It should be noted that, in certain embodiments, the configuration of the resilient unit 54 may be different (e.g., the configurations of the resilient members 541 may be different, or the resilient unit 54 may not include the resilient members 541), as long as the resilient unit 54 is capable of pushing the protruding portions 523 to urge the rotary member 52 to rotate between the locking position and the unlocking position when the transmission gear 53 rotates.

In addition, in certain embodiments, the rotary member 52 may have only one protruding portion to achieve the same effect.

The electronic lock may be mounted to a right-handed door. In that case, when the control unit 75 executes each of the locking and unlocking procedures, the direction of the rotation of each of the transmission gear 53, the rotary member 52 and the lock orientation member 71 may be reversed. Therefore, in the unlocking procedure, when the lock orientation member 71 rotates, the lever 721 is sequentially pushed by the other one of the middle state-converting portions 712 and the other one of the distal state-converting portions 712 in the second rotating direction 902, which will cause the first detecting member 72 to be sequentially converted from the first detecting state into the second detecting state, from the second detecting state into the first detecting state, and from the first detecting state into the second detecting state. In the locking procedure, when the lock orientation member 71 rotates, the lever 721 will be sequentially separated from the other one of the distal state-converting portions 712, be pushed by the other one of the middle state-converting portions 712 in the first rotating direction 901, and be separated from the other one of the middle state-converting portions 712, which will cause the first detecting member 72 to be sequentially converted from the second detecting state into the first detecting state, from the first detecting state into the third detecting state, and from the third detecting state into the first detecting state.

In summary, by virtue of the rotary member 52 having the protruding portions 523, by virtue of the driver mechanism 6 driving the transmission gear 53 to rotate, and by virtue of the resilient unit 54 being capable of pushing the protruding portions 523 to urge the rotary member 52 to rotate via the rotation of the transmission gear 53, the structure of the electronic lock 200 is simplified, which makes the assembly of the electronic lock 200 relatively easy.

In addition, by virtue of the rotation member 73 being driven by the driver mechanism 6 to rotate, and by virtue of the second detecting member 74 detecting the rotation of the rotation member 73, the angle of the rotation of the transmission gear 53 can be accurately detected when the transmission gear 53 is driven by the driver mechanism 6 to rotate. Consequently, the control unit 75 can accurately cease the operation of the driver mechanism 6 so that the position of the transmission gear 53 will not deviate from the initial position when the transmission gear 53 is rotated from one of the first and second positions to the initial position, which can reduce possible operation errors of the electronic lock 200. Therefore, the purpose of the disclosure is achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic lock comprising:

a deadbolt operable to convert between a locking state and an unlocking state;

a driver mechanism;

a transmission mechanism including a transmission gear that has a shaft hole extending along a rotating axis of said transmission gear, and that is driven by said driver mechanism to rotate when said driver mechanism is actuated, a resilient unit that is mounted to and co-rotatable with said transmission gear, and that defines a movement space corresponding in position to said shaft hole, and a rotary member that is connected to said deadbolt, that is operable to rotate relative to said transmission gear between a locking position and an unlocking position, and that has a shaft portion extending through said shaft hole, rotatable relative to said transmission gear about the rotating axis, and having an outer surrounding surface, and at least one protruding portion protruding from said outer surrounding surface, and rotating about the rotating axis in said movement space when said rotary member rotates, said resilient unit being capable of pushing said at least one protruding portion to urge said rotary member to rotate between the locking position and the unlocking position when said transmission gear rotates, said deadbolt being correspondingly converted between the locking state and the unlocking state when said rotary member rotates between the locking position and the unlocking position; and a control mechanism connected to said rotary member, and ceasing operation of said driver mechanism when detecting that said rotary member has been rotated to one of the locking position and the unlocking position;

wherein said control mechanism is configured to store a locking procedure and an unlocking procedure that are executed one at a time;

wherein, when said control mechanism executes the unlocking procedure, said control mechanism controls said driver mechanism to drive said transmission gear to rotate from an initial position to a first position in a first rotating direction so that said resilient unit urges said rotary member to rotate from the locking position to the unlocking position, and said control mechanism subsequently controls said driver mechanism to drive said transmission gear to rotate relative to said rotary member from the first position to the initial position in a second rotating direction opposite to the first rotating direction;

wherein, when said control mechanism executes the locking procedure, said control mechanism controls said driver mechanism to drive said transmission gear to rotate from the initial position to a second position in the second rotating direction so that said resilient unit urges said rotary member to rotate from the unlocking position to the locking position, and said control mechanism subsequently controls said driver mechanism to drive said transmission gear to rotate relative to said rotary member from the second position to the initial position in the first rotating direction;

wherein, when said transmission gear is at the initial position, said rotary member is operable to rotate relative to said transmission gear between the unlocking position and the locking position without driving rotation of said transmission gear;

wherein said control mechanism includes a lock orientation member that is fixedly sleeved onto said shaft portion of said rotary member and that is co-rotatable with said rotary member, a first detecting member, and a control unit that is signally coupled to said first detecting member and said driver mechanism;

wherein said lock orientation member is rotatable relative to said first detecting member, said first detecting member being convertible among three detecting states upon the relative rotation of said lock orientation member, and generating first detecting signals that respectively correspond to the detecting states;

wherein said control mechanism is further configured to store a locked signal set and an unlocked signal set, said control unit determining whether said first detecting member generates the first detecting signals that conform with one of the locked signal set and the unlocked signal set;

wherein, when said control mechanism executes the unlocking procedure, said control unit ceases the operation of said driver mechanism while determining that the first detecting signals generated by said first detecting member conform with the unlocked signal set; and wherein, when said control mechanism executes the locking procedure, said control unit ceases the operation of said driver mechanism while determining that the first detecting signals generated by said first detecting member conform with the locked signal set.

2. The electronic lock as claimed in claim 1, wherein:

said lock orientation member has four state-converting portions that are disposed about the rotating axis and spaced apart from each other, said state-converting portions being divided into two distal state-converting portions, and two middle state-converting portions that are located between said distal state-converting portions in a circumferential direction of said lock orientation member;

when said lock orientation member rotates relative to said first detecting member and pushes said first detecting member via one of said middle state-converting portions thereof, said first detecting member is converted from a first detecting state into one of a second detecting state and a third detecting state;

when said lock orientation member rotates relative to said first detecting member and pushes said first detecting member via one of said distal state-converting portions thereof, said first detecting member is converted from the first detecting state into the second detecting state; and when said lock orientation member rotates relative to said first detecting member and pushes said first detecting member via the other one of said distal state-converting portions thereof, said first detecting member is converted from the first detecting state into the third detecting state.

3. The electronic lock as claimed in claim 2, wherein said lock orientation member further has an outer surrounding surface that has a detecting zone extending about the rotating axis, said state-converting portions protruding at intervals at said detecting zone, said first detecting member including a lever, said first detecting member being converted from the first detecting state into one of the second and the third states when said lever is pushed by one of said state-converting portions of said lock orientation member.

4. The electronic lock as claimed in claim 3, wherein:

said lock orientation member has an imaginary axis that is perpendicular to the rotating axis, said detecting zone being symmetrical with respect to an imaginary plane on which the imaginary axis and the rotating axis lie, said state-converting portions being symmetrical with respect to the imaginary plane; and when said deadbolt is in the locking state, said lever of said first detecting member is pointed in a direction of the imaginary axis of said lock orientation member, and is kept at a distance from said state-converting portions of said lock orientation member.

5. The electronic lock as claimed in claim 1, wherein:

said control mechanism further includes a rotation member that is driven by said driver mechanism to rotate, and a second detecting member that is signally coupled to said control unit, and that generates a second detecting signal when detecting rotation of said rotation member;

said control unit determines whether an angle of the rotation of said transmission gear reaches a preset angle by analyzing the second detecting signal generated by said second detecting member; and after said driver mechanism drives said transmission gear to rotate relative to said rotary member, said control unit ceases the operation of said driver mechanism when determining that the angle of the rotation of said transmission gear reaches the preset angle.

6. The electronic lock as claimed in claim 5, wherein said rotation member is configured to be a gear that is driven by said driver mechanism, and has a plurality of spaced-apart rotation indicating portions that are arranged about a rotating axis of said rotation member, said second detecting member generating the second detecting signal when detecting rotation of said rotation indicating portions about the rotating axis of said rotation member.

7. The electronic lock as claimed in claim 6, wherein each of said rotation indicating portions is magnetic so that when said rotation indicating portions rotate about the rotating axis of said rotation member relative to said second detecting member, said second detecting member detects changes in a magnetic field of said rotation member and correspondingly generates the second detecting signal.

8. The electronic lock as claimed in claim 6, wherein said second detecting member emits light toward said rotation member, said rotation indicating portions being capable of reflecting the light, said second detecting member correspondingly generating the second detecting signal when detecting that the light is reflected.

9. The electronic lock as claimed in claim 6, wherein said second detecting member emits light toward said rotation member, said rotation indicating portions allowing the light to travel therethrough, said second detecting member correspondingly generating the second detecting signal when detecting that the light travels through said rotation indicating portions.

10. An electronic lock comprising:

a deadbolt operable to convert between a locking state and an unlocking state;

a driver mechanism;

a transmission mechanism including a transmission gear that has a shaft hole extending along a rotating axis of said transmission gear, and that is driven by said driver mechanism to rotate when said driver mechanism is actuated, a resilient unit that is mounted to and co-rotatable with said transmission gear, that defines a movement space corresponding in position to said shaft hole, and that includes at least one resilient member extending across said shaft hole in a direction orthogonal to the rotating axis and mounted to said transmission gear, and a rotary member that is connected to said deadbolt, that is operable to rotate relative to said transmission gear between a locking position and an unlocking position, and that has a shaft portion extending through said shaft hole, rotatable relative to said transmission gear about the rotating axis, and having an outer surrounding surface, and at least one protruding portion protruding from said outer surrounding surface, and rotating about the rotating axis in said movement space when said rotary member rotates, said resilient unit being capable of pushing said at least one protruding portion to urge said rotary member to rotate between the locking position and the unlocking position when said transmission gear rotates, said deadbolt being correspondingly converted between the locking state and the unlocking state when said rotary member rotates between the locking position and the unlocking position; and a control mechanism connected to said rotary member, and ceasing operation of said driver mechanism when detecting that said rotary member has been rotated to one of the locking position and the unlocking position;

wherein, said at least one resilient member is located at one side of said shaft portion of said rotary member;

wherein, when said rotary member is rotated to one of the locking position and the unlocking position, said at least one protruding portion of said rotary member abuts against said at least one resilient member so that movement of said rotary member is restrained by said at least one resilient member;

wherein said control mechanism is configured to store a locking procedure and an unlocking procedure that are executed one at a time, and includes a lock orientation member that is fixedly sleeved onto said shaft portion of said rotary member and that is co-rotatable with said rotary member, a first detecting member, and a control unit that is signally coupled to said first detecting member and said driver mechanism;

wherein said lock orientation member is rotatable relative to said first detecting member, said first detecting member being convertible among three detecting states upon the relative rotation of said lock orientation member, and generating first detecting signals that respectively correspond to the detecting states;

wherein said control mechanism is further configured to store a locked signal set and an unlocked signal set, said control unit determining whether said first detecting member generates the first detecting signals that conform with one of the locked signal set and the unlocked signal set;

wherein, when said control mechanism executes the unlocking procedure, said control unit ceases the operation of said driver mechanism while determining that the first detecting signals generated by said first detecting member conform with the unlocked signal set;

wherein, when said control mechanism executes the locking procedure, said control unit ceases the operation of said driver mechanism while determining that the first detecting signals generated by said first detecting member conform with the locked signal set;

wherein said control mechanism further includes a rotation member that is driven by said driver mechanism to rotate, and a second detecting member that is signally coupled to said control unit, and that generates a second detecting signal when detecting rotation of said rotation member;

wherein said control unit determines whether an angle of the rotation of said transmission gear reaches a preset angle by analyzing the second detecting signal generated by said second detecting member; and wherein, after said driver mechanism drives said transmission gear to rotate relative to said rotary member, said control unit ceases the operation of said driver mechanism when determining that the angle of the rotation of said transmission gear reaches the preset angle.

* * * * *